United States Patent
Doering et al.

(10) Patent No.: US 9,031,722 B2
(45) Date of Patent: May 12, 2015

(54) METHOD AND SYSTEM FOR IMPROVING HYBRID VEHICLE SHIFTING

(71) Applicant: Ford Global Technologies, LLC, Dearborn, MI (US)

(72) Inventors: Jeffrey Allen Doering, Canton, MI (US); Dennis Craig Reed, Dexter, MI (US); Alex O'Connor Gibson, Ann Arbor, MI (US); Gregory Michael Pietron, Canton, MI (US); James William Loch McCallum, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 24 days.

(21) Appl. No.: 13/710,257

(22) Filed: Dec. 10, 2012

(65) Prior Publication Data

US 2014/0163788 A1     Jun. 12, 2014

(51) Int. Cl.
| | |
|---|---|
| *B60W 20/00* | (2006.01) |
| *B60W 10/02* | (2006.01) |
| *B60W 10/115* | (2012.01) |
| *B60W 30/19* | (2012.01) |
| B60K 6/48 | (2007.10) |

(52) U.S. Cl.
CPC .............. *B60W 20/10* (2013.01); *Y10T 477/26* (2015.01); *B60W 10/023* (2013.01); *B60W 10/026* (2013.01); *B60W 10/115* (2013.01); *B60W 30/19* (2013.01); B60K 2006/4825 (2013.01); B60W 2510/0695 (2013.01); B60W 2510/088 (2013.01); B60W 2710/027 (2013.01); B60W 2710/1005 (2013.01); *B60W 20/30* (2013.01); *B60W 2510/0266* (2013.01); *Y02T 10/6252* (2013.01)

(58) Field of Classification Search
None
See application file for complete search history.

(56) References Cited

U.S. PATENT DOCUMENTS

| | | | | | |
|---|---|---|---|---|---|
| 3,988,008 | A | * | 10/1976 | Morrow et al. | 254/303 |
| 4,324,156 | A | * | 4/1982 | Iwanaga et al. | 477/136 |
| 5,274,553 | A | * | 12/1993 | Boardman | 701/55 |
| 5,628,706 | A | * | 5/1997 | Zhang | 477/166 |
| 5,758,302 | A | * | 5/1998 | Schulz et al. | 701/51 |
| 6,183,389 | B1 | * | 2/2001 | Tabata | 477/5 |
| 6,253,140 | B1 | * | 6/2001 | Jain et al. | 701/67 |
| 6,278,915 | B1 | * | 8/2001 | Deguchi et al. | 701/22 |
| 6,434,466 | B1 | * | 8/2002 | Robichaux et al. | 701/54 |
| 6,701,246 | B2 | * | 3/2004 | Riedle et al. | 701/110 |
| 6,974,402 | B2 | * | 12/2005 | Colvin et al. | 477/5 |
| 7,044,885 | B2 | * | 5/2006 | Doering | 477/54 |
| 7,264,570 | B2 | * | 9/2007 | Heap et al. | 477/3 |
| 7,517,298 | B2 | * | 4/2009 | Ortmann | 477/3 |
| 7,644,812 | B2 | * | 1/2010 | Simpson et al. | 192/3.33 |
| 7,815,026 | B2 | * | 10/2010 | Povirk et al. | 192/3.26 |
| 7,931,551 | B2 | * | 4/2011 | Katou et al. | 474/28 |
| 8,352,137 | B2 | * | 1/2013 | Inagaki et al. | 701/55 |
| 8,538,643 | B1 | * | 9/2013 | Wang et al. | 701/53 |
| 8,690,725 | B2 | * | 4/2014 | Nedorezov et al. | 477/5 |
| 8,715,136 | B1 | * | 5/2014 | Dai et al. | 477/5 |

(Continued)

*Primary Examiner* — Helal A Algahaim
*Assistant Examiner* — Kelly D Williams
(74) *Attorney, Agent, or Firm* — Julia Voutyras; Alleman Hall McCoy Russell & Tuttle LLP (57) ABSTRACT

A method and a system for improving operation of a hybrid vehicle are presented. In one example, torque converter impeller torque from beginning to end of transmission shifting is adjusted in response to variable driveline inertia. The approach may improve transmission shifting and reduce driveline torque disturbances.

10 Claims, 4 Drawing Sheets

(56) References Cited

U.S. PATENT DOCUMENTS

| | | | |
|---|---|---|---|
| 8,758,200 B2* | 6/2014 | Dai et al. | 477/176 |
| 2005/0193980 A1* | 9/2005 | Doering | 123/406.47 |
| 2008/0051248 A1* | 2/2008 | Kozarekar et al. | 477/3 |
| 2009/0037060 A1* | 2/2009 | Carlhammar et al. | 701/54 |
| 2009/0326778 A1* | 12/2009 | Soliman et al. | 701/84 |
| 2010/0174460 A1* | 7/2010 | Gibson et al. | 701/54 |
| 2010/0250037 A1* | 9/2010 | Yoshida et al. | 701/22 |
| 2011/0184616 A1* | 7/2011 | Holtz | 701/68 |
| 2013/0297123 A1* | 11/2013 | Gibson et al. | 701/22 |
| 2013/0297162 A1* | 11/2013 | Dai et al. | 701/55 |
| 2013/0297191 A1* | 11/2013 | Gibson et al. | 701/112 |
| 2013/0304293 A1* | 11/2013 | Yoshikawa et al. | 701/22 |
| 2013/0331228 A1* | 12/2013 | Miyazaki et al. | 477/5 |
| 2014/0163788 A1* | 6/2014 | Doering et al. | 701/22 |

* cited by examiner

METHOD AND SYSTEM FOR IMPROVING HYBRID VEHICLE SHIFTING

FIELD

The present description relates to a system and method for improving hybrid vehicle shifting. The method and system may be particularly useful for engines that are selectively coupled to an electrical machine and a transmission.

BACKGROUND AND SUMMARY

A driveline of a hybrid vehicle may include and engine and a motor that are selectively coupled together. The engine and motor may be selectively coupled together via a disconnect clutch. The engine and motor may also be coupled to an automatic transmission. The automatic transmission may include a torque converter and a plurality of fixed gear ratios. The engine and motor may supply torque to vehicle wheels via the transmission to propel the hybrid vehicle. During a course of driving, the transmission may switch gears so that vehicle acceleration and energy efficiency may be improved. However, a driver may sense a difference in vehicle acceleration across transmission gear shifting or experience different shift feel when the disconnect clutch is closed as compared to when the disconnect clutch is open.

The inventors herein have recognized the above-mentioned issues and have developed a method for operating a hybrid powertrain, comprising: operating a drivetrain with a first inertia and adjusting a torque converter impeller torque during transmission gear shifting in response to the first inertia; and operating the drivetrain with a second inertia and adjusting the torque converter impeller torque during transmission gear shifting in response to the second inertia.

By adjusting a torque converter impeller torque in response to different driveline inertias, it may be possible to improve transmission gear shifting of a hybrid vehicle. For example, impeller torque during a first set of conditions can be adjusted to a greater torque when driveline inertia is at a maximum driveline inertia (e.g., an inertia that includes an engine and a motor). Further, during conditions that are substantially the same as the first set of conditions, excluding the driveline inertia, impeller torque can be adjusted to torque that is less than during the first set of conditions when the driveline inertia is less than the maximum driveline inertia (e.g., an inertia including the motor and excluding the engine). In this way, torque converter impeller torque may be adjusted to account for driveline inertia changes that result from opening and closing the driveline disconnect clutch.

The present description may provide several advantages. Specifically, the approach may improve vehicle shifting. Further, the approach may reduce clutch wear. Further still, the approach may improve vehicle drivability.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
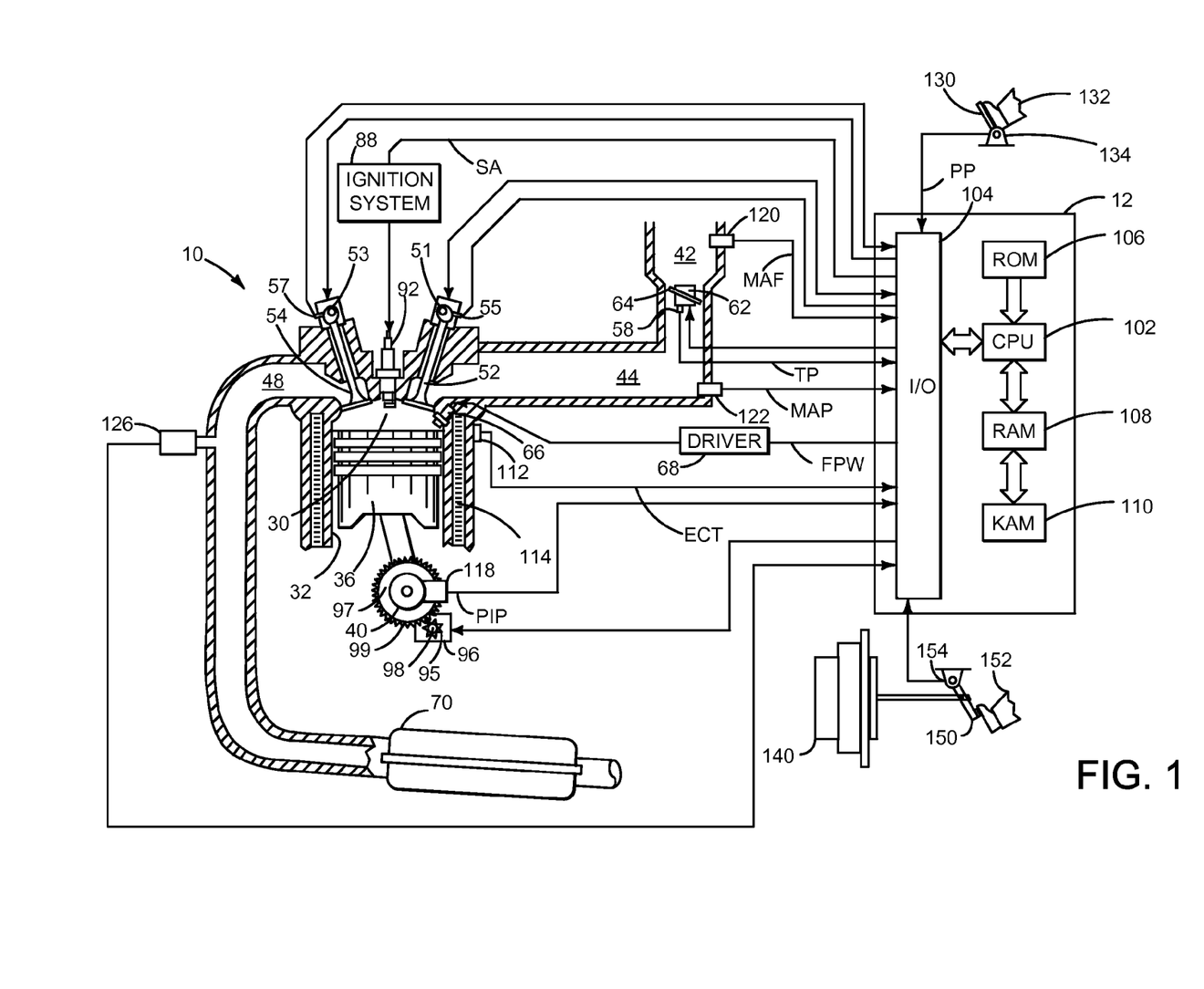
FIG. 1 is a schematic diagram of an engine.
Figure 2:
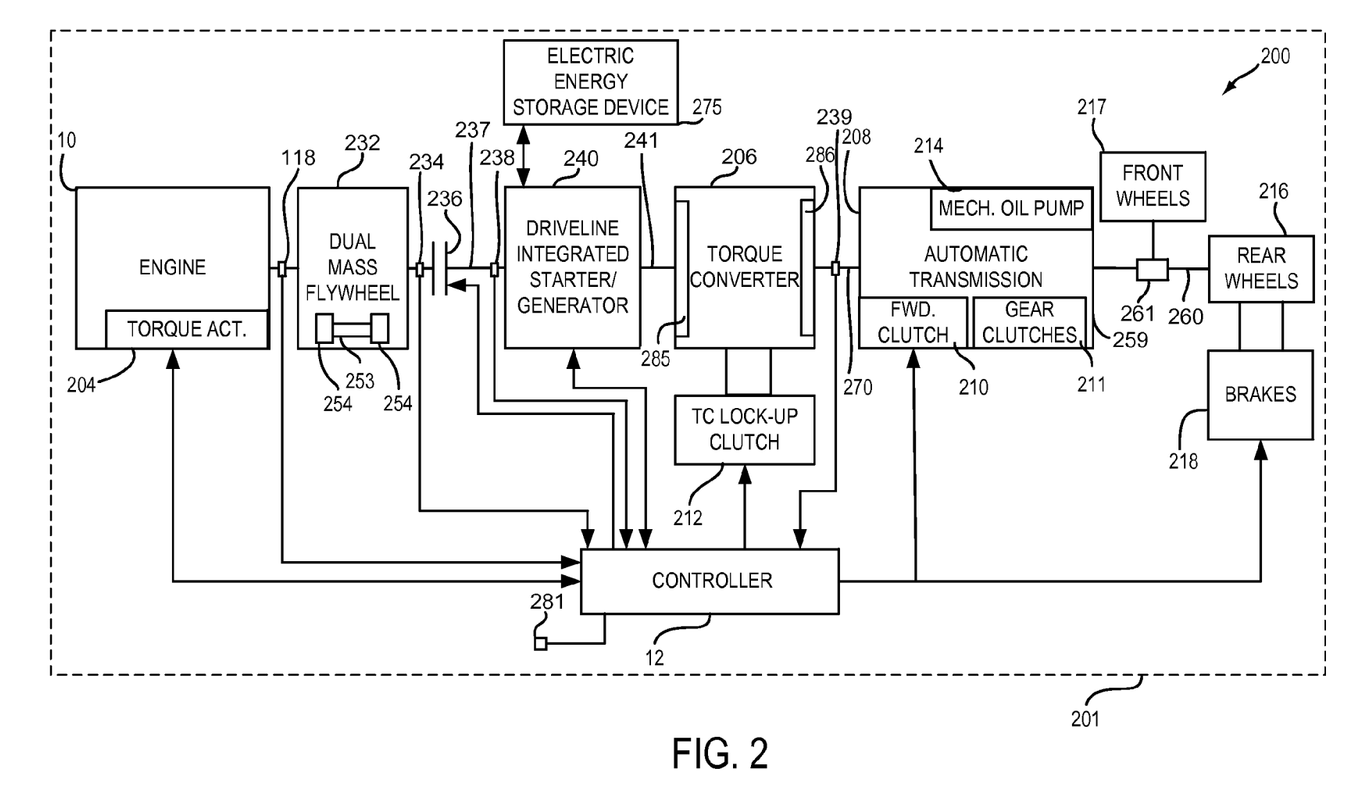
FIG. 2 shows an example vehicle and vehicle driveline configuration.

The present description is related to controlling a hybrid vehicle powertrain. The hybrid vehicle may include an engine and electric machine as shown in FIGS. 1-2. The engine may be operated with or without a driveline integrated starter/generator (DISG) during vehicle operation. The driveline integrated starter/generator is integrated into the driveline on the same axis as the engine crankshaft and rotates whenever the torque converter impeller rotates. Further, the DISG may not be selectively engaged or disengaged from the driveline. Rather, the DISG is an integral part of the driveline. Further still, the DISG may be operated with or without operating the engine. The mass and inertia of the DISG remain with the driveline even when the DISG is not operating. The hybrid vehicle may estimate torque converter impeller torque based on whether or not the engine is engaged to the motor and downstream driveline components.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from air intake 42 to intake manifold 44. In one example, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Vehicle wheel brakes or regenerative braking via a DISG may be provided when brake pedal 150 is applied via foot 152. Brake pedal sensor 154 supplies a signal indicative of brake pedal position to controller 12. Foot 152 is assisted by brake booster 140 applying vehicle brakes.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. Engine position sensor 118 produces a predetermined number of equally spaced pulses every revolution of the crankshaft from which engine speed (RPM) can be determined.

In some examples, the engine may be coupled to an electric motor/battery system in a hybrid vehicle as shown in FIG. 2. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 201 and vehicle driveline 200. Driveline 200 may be powered by engine 10. Engine 10 may be started with an engine starting system shown in FIG. 1 or via DISG 240. Further, engine 10 may generate or adjust torque via torque actuator 204, such as a fuel injector, throttle, etc.

An engine output torque may be transmitted to an input side of dual mass flywheel (DMF) 232. Engine speed as well as dual mass flywheel input side position and speed may be determined via engine position sensor 118. Dual mass flywheel 232 may include springs 253 and separate masses 254 for dampening driveline torque disturbances. The output side of dual mass flywheel 232 is shown being mechanically coupled to the input side of disconnect clutch 236. Disconnect clutch 236 may be electrically or hydraulically actuated. A position sensor 234 is positioned on the disconnect clutch side of dual mass flywheel 232 to sense the output position and speed of the dual mass flywheel 232. The downstream side of disconnect clutch 236 is shown mechanically coupled to DISG input shaft 237.

DISG 240 may be operated to provide torque to driveline 200 or to convert driveline torque into electrical energy to be stored in electric energy storage device 275. DISG 240 has a higher output power capacity than starter 96 shown in FIG. 1. Further, DISG 240 directly drives driveline 200 or is directly driven by driveline 200. There are no belts, gears, or chains to couple DISG 240 to driveline 200. Rather, DISG 240 rotates at the same rate as driveline 200. Electrical energy storage device 275 may be a battery, capacitor, or inductor. The downstream side of DISG 240 is mechanically coupled to the impeller 285 of torque converter 206 via shaft 241. The upstream side of the DISG 240 is mechanically coupled to the disconnect clutch 236. Torque converter 206 includes a turbine 286 to output torque to transmission input shaft 270. Transmission input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission. Torque converter turbine speed and position may be determined via position sensor 239. In some examples, 238 and/or 239 may be torque sensors or may be combination position and torque sensors.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-6) 211 and forward clutch 210. The gear clutches 211 and the forward clutch 210 may be selectively engaged to propel a vehicle. Torque output from the automatic transmission 208 may in turn be relayed to rear wheels 216 to propel the vehicle via output shaft 260. Specifically, automatic transmission 208 may transfer an input driving torque at the input shaft 270 responsive to a vehicle traveling condition before transmitting an output driving torque to the rear wheels 216. Torque may also be directed to front wheels 217 via transfer case 261.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

A mechanical oil pump 214 may be in fluid communication with automatic transmission 208 to provide hydraulic pressure to engage various clutches, such as forward clutch 210, gear clutches 211, and/or torque converter lock-up clutch 212. Mechanical oil pump 214 may be operated in accordance with torque converter 206, and may be driven by the rotation of the engine or DISG via input shaft 241, for example. Thus, the hydraulic pressure generated in mechanical oil pump 214 may increase as an engine speed and/or DISG speed increases, and may decrease as an engine speed and/or DISG speed decreases.

Controller 12 may be configured to receive inputs from engine 10, as shown in more detail in FIG. 1, and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art. Controller 12 also receives driving surface grade input information from inclinometer 281.

When idle-stop conditions are satisfied, controller 42 may initiate engine shutdown by shutting off fuel and spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle. When engine restart conditions are satisfied, and/or a vehicle operator wants to launch the vehicle, controller 12 may reactivate the engine by resuming combustion in engine cylinders.

Thus, the system of FIGS. 1 and 2 provides for operating a hybrid powertrain, comprising: an engine; a driveline integrated starter/generator (DISG); a disconnect clutch positioned in a driveline between the engine and the DISG; and a controller including executable instructions stored in non-transitory memory, the executable instructions providing adjusting a state of a disconnect clutch in response to a state of an energy storage device, the executable instructions further providing for substantially contemporaneously (e.g., determining both torque converter impeller torques within 1 second of each other) determining a first and a second torque converter impeller torque. In this way, a transmission shifting of a drivetrain having a variable inertia may be improved.

The system includes where the first torque converter impeller torque is based on a first driveline inertia. The system includes where the second torque converter impeller torque is based on a second driveline inertia, the second driveline inertia different from the first driveline inertia. The system includes where the second driveline inertia includes inertia of the engine. The system includes where the first driveline inertia does not include inertia of the engine. The system further comprises a transmission coupled to the engine and additional executable instructions to shift the transmission and output a desired torque converter impeller torque that is based on the first or second torque converter impeller torque.

Figure 3:
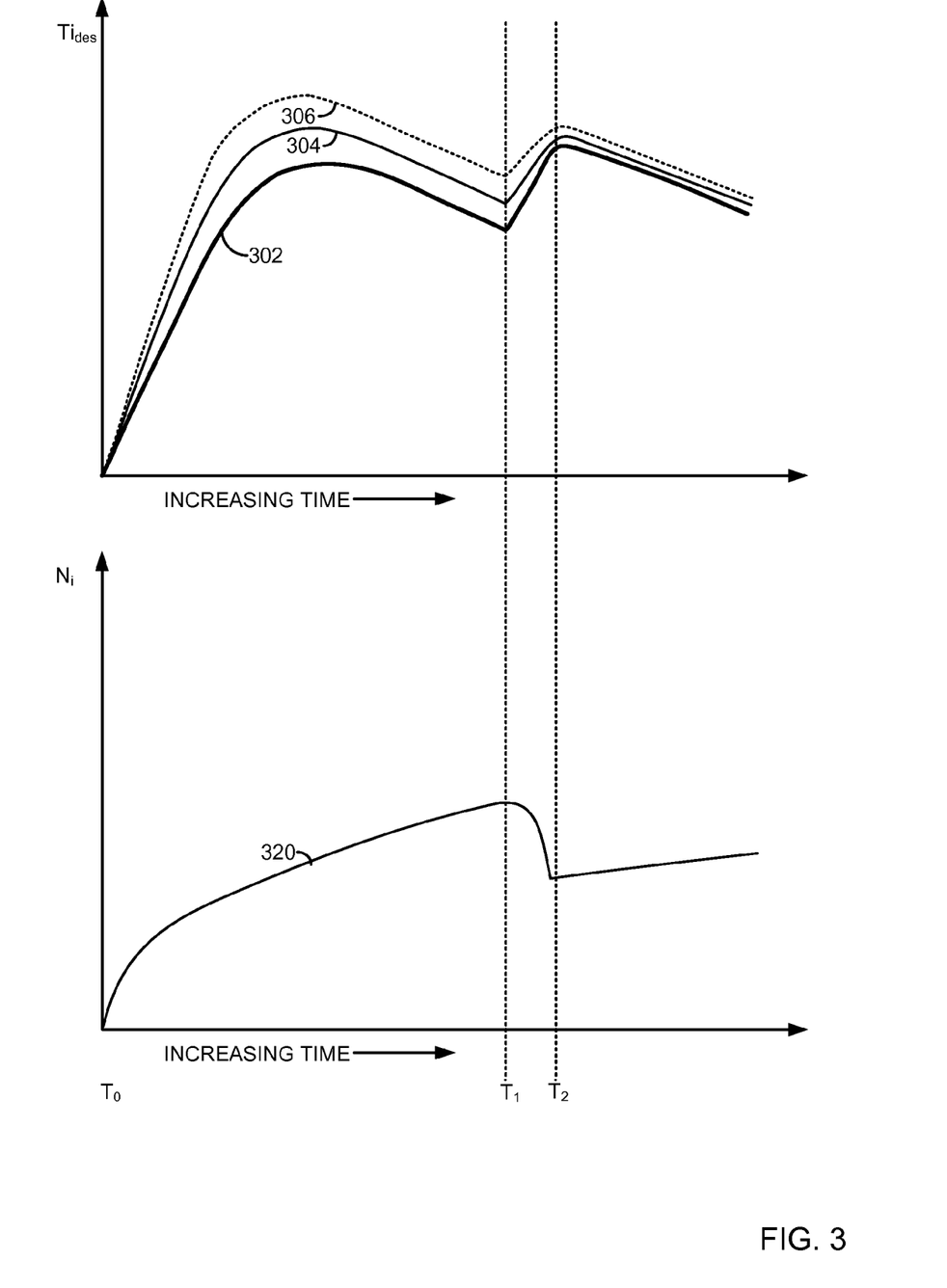
FIG. 3 shows an example transmission gear shift.

Referring now to FIG. 3, plots of selected variables during an example transmission gear shifting procedure are shown. The gear shifting procedure may be performed by the system of FIGS. 1 and 2 according to the method of FIG. 4. The two plots of FIG. 3 are shown on the same time scale.

The first plot from the top of FIG. 3 shows a plot of desired transmission torque converter impeller torque verses time. The Y axis represents desired transmission torque converter impeller torque and desired transmission torque converter impeller torque increases in the direction of the Y axis arrow. The X axis represents time and time increases in the direction of the X axis arrow. Curve 302 represents desired transmission torque converter impeller torque not including $\dot{N}I$ compensation. Curve 304 represents desired transmission torque converter impeller torque including $\dot{N}I$ compensation when driveline inertia is a first inertia, the first inertia being less than a second driveline inertia. Curve 306 represents desired transmission torque converter impeller torque including $\dot{N}I$ compensation when driveline inertia is a second inertia, the second inertia being greater than the first driveline inertia. The $\dot{N}I$ compensation is provided to produce equal acceleration through gear changes during similar conditions where driveline inertias are different.

The second plot from the top of FIG. 3 shows a plot of transmission torque converter impeller speed verses time. The Y axis represents transmission torque converter impeller speed and transmission torque converter impeller speed increases in the direction of the Y axis arrow. The X axis represents time and time increases in the direction of the X axis arrow. Curve 320 represents transmission torque converter impeller speed for conditions when desired transmission torque converter impeller torque is not compensated for $\dot{N}I$, when desired transmission torque converter impeller torque is compensated for a first inertia, and for when desired transmission torque converter impeller torque is compensated for a second inertia that is greater than the first inertia. Thus, the inertia compensation provides equivalent transmission torque converter impeller speeds between different driveline inertias.

At time $T_0$, the transmission is in first gear and the desired transmission torque converter impeller torque begins to increase in response to an increasing driver torque demand (not shown). The desired transmission torque converter impeller torque not including $\dot{N}I$ compensation increases at a first rate that is lower than the other two desired torques since driveline inertia is not being compensated. The desired transmission torque converter impeller torque including ṄI compensation when driveline inertia is a first inertia (curve 304) increases at a second rate that is between curve 302 and curve 306. The desired transmission torque converter impeller torque including ṄI compensation when driveline inertia is a second inertia increases at a third rate greater than curves 302 and 304. The desired transmission torque converter impeller torque increases as the driveline inertia increases so that equivalent vehicle acceleration may be provided even when driveline inertia increases.

Between time $T_0$ and time $T_1$, desired transmission torque converter impeller torques are reduced for impending transmission gear shifts. The transmission gear shifts may be scheduled as a function of driver torque demand and vehicle speed.

At time $T_1$, the transmission begins to shift from a first gear to a second gear, the second gear a higher gear than the first gear. Because the desired transmission torque converter impeller torque is based on gear ratios across the shift as explained in further detail below, the effective driveline inertia (e.g., the driveline inertia as observed at the transmission torque converter impeller) after the gear shift is increased causing the desired transmission torque converter impeller torque for the first and second inertias to decrease. Thus, the rate of change in desired transmission torque converter impeller torque when driveline inertia is a second inertia (e.g., curve 306) during the gear shift is less than the rate of change in desired transmission torque converter impeller torque when driveline inertia is a first inertia.

At time $T_2$, the transmission gear shift is complete and the difference between the desired transmission torque converter impeller torque not including ṄI compensation (curve 302), the desired transmission torque converter impeller torque including ṄI compensation when driveline inertia is a first inertia (curve 304), and the desired transmission torque converter impeller torque including ṄI compensation when driveline inertia is a second inertia (curve 306), is reduced as compared to the torque difference between the curves before time $T_1$.

Figure 4:
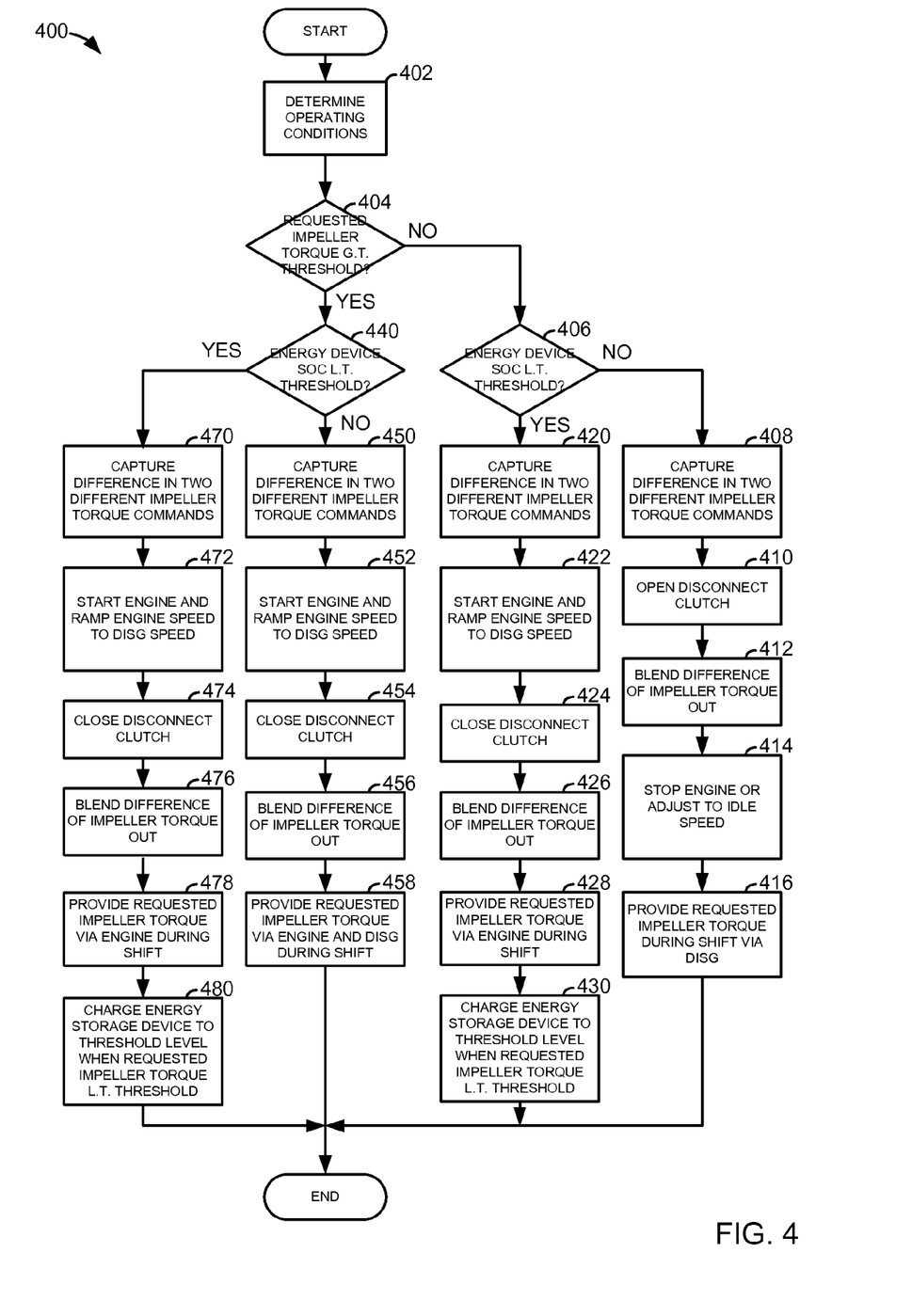
FIG. 4 shows a method for improving hybrid powertrain shifting.

In this way, the method of FIG. 4 may provide equivalent vehicle acceleration across transmission gear shifts during similar driving conditions even though the driveline inertia may change due to operating the driveline disconnect clutch. Thus, vehicle drivability may be improved.

Referring now to FIG. 4 an example method for operating a hybrid vehicle powertrain is shown. The method of FIG. 4 may be stored as executable instructions in non-transitory memory in the system of FIGS. 1 and 2. Further, the method of FIG. 4 may provide the sequence shown in FIG. 3.

At 402, method 400 determines operating conditions. Operating conditions may include but are not limited to driver demand torque, engine speed, disconnect clutch operating state, DISG speed, DISG current, and energy storage device SOC. Further, the desired transmission torque converter impeller torque when a disconnect clutch is open and the desired transmission torque converter impeller torque when a disconnect clutch is closed are determined are determined based on the following equations:

$$T_{imp\_open} = \frac{T_{Odes}}{R} + \text{offset} + \dot{N}_{impexp} \cdot I_{imp\_open}$$

$$T_{imp\_close} = \frac{T_{Odes}}{R} + \text{offset} + \dot{N}_{impexp} \cdot I_{imp\_close}$$

Where $T_{imp\_open}$ is impeller torque when the disconnect clutch is open; $T_{imp\_close}$ is impeller torque when the disconnect clutch is closed; $T_{Odes}$ is desired transmission shaft output torque; $\dot{N}_{imp\_exp}$ is expected torque converter acceleration based on achieving $T_{Odes}$ with vehicle mass, road load, where offset is an empirically determined value that accounts for driveline spin losses; and final drive ratio; R is the torque ratio from the impeller to the transmission output shaft; $I_{imp\_open}$ is driveline inertia rotating with the torque converter impeller when the disconnect clutch is open; and $I_{imp\_close}$ is driveline inertia rotating with the torque converter impeller when the disconnect clutch is closed. Method 400 proceeds to 404 after operating conditions are determined.

At 404, method 400 judges whether or not a desired transmission torque converter impeller torque when a disconnect clutch is open is greater than a threshold amount of torque. The threshold amount of torque may vary depending on vehicle operating conditions. For example, the threshold amount of torque may decrease as ambient temperature decreases and increase as ambient temperature increases. If method 400 judges that the desired transmission torque converter impeller torque when the disconnect clutch is open is greater than the threshold amount of torque, the answer is yes and method 400 proceeds to 440. Otherwise, the answer is no and method 400 proceeds to 406. In this way, method 400 judges whether driveline inertia includes both a motor and an engine inertia or motor inertia without the engine inertia.

At 406, method 400 judges whether or not the energy storage device SOC is less than a threshold state of charge. In one example, a voltage of a battery is compared to a threshold voltage to determine if the SOC is greater than a threshold. If method 400 judges that the energy storage device SOC is less than a threshold, the answer is yes and method 400 proceeds to 420. Otherwise, the answer is no and method 400 proceeds to 408.

At 408, method 400 captures and records a difference between the desired transmission torque converter impeller torque when the disconnect clutch is open and the desired transmission torque converter impeller torque when the disconnect clutch is closed to memory. Method 400 proceeds to 410 after the difference in desired transmission impeller torques is captured and recorded.

At 410, method 400 opens the driveline disconnect clutch. The driveline disconnect clutch may be opened via an electrical or hydraulic actuator. Method 400 proceeds to 412 after the driveline disconnect clutch opens.

At 412, method 400 commands the DISG torque. Specifically, when the disconnect clutch is transitioning from a closed state to an open state, the DISG is commanded to the desired transmission torque converter impeller torque when the disconnect clutch is open. Further, the DISG torque is gradually reduced by the difference captured at 408. After DISG torque is reduced by the captured difference, the DISG is commanded to provide the desired transmission torque converter impeller torque when the disconnect clutch is open as determined at 402. If the disconnect clutch is already open, the DISG is commanded to provide the desired transmission torque converter impeller torque when the disconnect clutch is open as determined at 402. Method 400 proceeds to 414 after transmission torque converter impeller torque is adjusted.

At 414, method 400 stops the engine if the engine is running. Alternatively, the engine may be adjusted to an idle speed. Method 400 proceeds to 416 after the engine is stopped or adjusted to an idle speed.

At 416, method 400 provides a desired transmission torque converter impeller torque during shifting based on driveline inertia when the disconnect clutch is opened. For example, the driveline inertia is reduced by an amount of the engine inertia and a portion of the disconnect clutch inertia. In one example, torque converter impeller torque is matched across transmission upshifts (e.g., a shift from $1^{st}$ gear to $2^{nd}$ gear) based on the equation:

$$T_2 = RT_1 + I_{imp\_open}\dot{N}_1\left(\frac{1}{R} - R\right)$$

Where $T_2$ is transmission torque converter impeller torque after a gear shift; $T_1$ is transmission torque converter impeller torque before the gear shift; $\dot{N}_1$ is transmission torque converter impeller acceleration in an initial gear before the gear shift; R is a ratio of gears across the shift; and $I_{imp\_open}$ is driveline inertia when the disconnect clutch is open (e.g., not coupling the engine to the DISG). Method 400 proceeds to exit after impeller torque across the shift (e.g., from the start of gear shift when the transmission is in a first gear to an engine of gear shift when the transmission is in a second gear) is adjusted.

At 420, method 400 captures and records a difference between the desired transmission torque converter impeller torque when the disconnect clutch is open and the desired transmission torque converter impeller torque when the disconnect clutch is closed to memory. Method 400 proceeds to 422 after the difference in desired transmission impeller torques is captured and recorded.

At 422, method 400 starts the engine and ramps engine speed to match DISG speed. The engine may be started via a starting system as shown in FIG. 1 or via the DISG. The DISG may start the engine via transferring DISG torque to the engine via at least partially closing the driveline disconnect clutch. Engine speed is adjusted via adjusting throttle position or valve timing. Method 400 proceeds to 424 after the engine is started and ramped up to DISG speed.

At 424, method 400 closes the driveline disconnect clutch. The driveline disconnect clutch may be close via an electrical or hydraulic actuator. Method 400 proceeds to 426 after the driveline disconnect clutch closes.

At 426, method 400 commands the engine torque to provide the desired driver demand torque and the DISG is commanded to a regeneration mode or to a free wheel mode where the DISG provides no torque to the driveline. In particular, after the disconnect clutch is closed, the DISG torque is ramped down at the same rate the engine torque is ramped up to a torque that provides the driver demand torque. The driver demand torque may be input via a pedal or other input device and it may correspond to an engine brake torque, transmission impeller torque, wheel torque, or other driveline torque depending on design considerations. Further, the engine torque is gradually increased by the difference captured at 408. The increase in torque compensates for the increased driveline inertia. After engine torque is increased and DISG torque is decreased, the engine is commanded to provide the desired transmission torque converter impeller torque when the disconnect clutch is closed as determined at 402. If the disconnect clutch is already closed, the engine is commanded to provide the desired transmission torque converter impeller torque when the disconnect clutch is closed from 402. Method 400 proceeds to 428 after transmission torque converter impeller torque is adjusted.

At 428, method 400 provides a desired transmission torque converter impeller torque during shifting based on driveline inertia when the disconnect clutch is closed. For example, the driveline inertia is increased by an amount of the engine inertia and a portion of the disconnect clutch inertia. In one example, torque converter impeller torque is matched across transmission upshifts (e.g., a shift from $1^{st}$ gear to $2^{nd}$ gear) based on the equation:

$$T_2 = RT_1 + I_{imp\_close}\dot{N}_1\left(\frac{1}{R} - R\right)$$

Where $T_2$ is transmission torque converter impeller torque after a gear shift; $T_1$ is transmission torque converter impeller torque before the gear shift; $\dot{N}_1$ is transmission torque converter impeller acceleration in an initial gear before the gear shift; R is a ratio of gears across the shift; and $I_{imp\_close}$ is driveline inertia when the disconnect clutch is closed (e.g., coupling the engine to the DISG). Method 400 proceeds to 430 after impeller torque across the shift (e.g., from the start of gear shift when the transmission is in a first gear to an engine of gear shift when the transmission is in a second gear) is adjusted.

At 430, method 400 charges the energy storage device to a threshold level of charge when the requested impeller torque is less than a threshold torque. Further, the energy storage device may be charged at selective times such as when the vehicle is decelerating to recover kinetic energy from the vehicle. In this way, the amount of fuel used to provide stored electrical energy may be reduced. The engine may also be operated at an output torque that is greater than the driver demand torque. The DISG operates in a generator mode to charge the energy storage device using engine torque that is greater than the driver demand torque. Method 400 proceeds to exit after the energy storage device continues or begins charging.

At 440, method 400 judges whether or not a SOC of the energy storage device is less than a threshold. The threshold may be the same threshold as at 406 or a different threshold. If method 400 judges that the energy storage device SOC is less than a threshold, the answer is yes and method 400 proceeds to 470. Otherwise, the answer is no and method 400 proceeds to 450.

At 450, method 400 captures and records a difference between the desired transmission torque converter impeller torque when the disconnect clutch is open and the desired transmission torque converter impeller torque when the disconnect clutch is closed to memory. Method 400 proceeds to 452 after the difference in desired transmission impeller torques is captured and recorded.

At 452, method 400 starts the engine and ramps engine speed to match DISG speed as described at 422. Method 400 proceeds to 454 after the engine is started and ramped up to DISG speed.

At 454, method 400 closes the driveline disconnect clutch. The driveline disconnect clutch may be close via an electrical or hydraulic actuator. Method 400 proceeds to 456 after the driveline disconnect clutch closes.

At 456, method 400 commands the engine and DISG to provide a combined torque matching the desired driver demand torque. For example, after the disconnect clutch is closed, the DISG torque is ramped down to a torque level that allows the engine to provide a portion of the desired driver demand torque at an efficient engine operating condition at the present engine speed. Further, the engine torque is ramped up as the DISG torque is ramped down. Additionally, the engine torque and/or DISG torque are gradually increased by the difference captured at 408. The increase in torque compensates for the increased driveline inertia. After engine torque and/or DISG torque are increased, the engine and/or DISG are commanded to provide the desired transmission torque converter impeller torque when the disconnect clutch is closed as determined at 402. If the disconnect clutch is already closed, the engine and/or DISG are commanded to provide the desired transmission torque converter impeller torque when the disconnect clutch is closed from 402. Method 400 proceeds to 458 after transmission torque converter impeller torque is adjusted.

At 458, method 400 provides a desired transmission torque converter impeller torque during shifting based on driveline inertia when the disconnect clutch is closed as is described at 428. However, the desired transmission torque converter impeller torque is provided via the engine and the DISG. In particular, the engine torque and DISG torque are summed to provide the desired transmission torque converter impeller torque.

At 470, method 400 captures and records a difference between the desired transmission torque converter impeller torque to controller memory when the disconnect clutch is open and the desired transmission torque converter impeller torque when the disconnect clutch is closed to memory. Method 400 proceeds to 472 after the difference in desired transmission impeller torques is captured and recorded.

At 472, method 400 starts the engine and ramps engine speed to match DISG speed as described at 422. Method 400 proceeds to 474 after the engine is started and ramped up to DISG speed.

At 474, method 400 closes the driveline disconnect clutch. The driveline disconnect clutch may be close via an electrical or hydraulic actuator. Method 400 proceeds to 476 after the driveline disconnect clutch closes.

At 476, method 400 commands the engine and DISG to provide a combined torque matching the desired driver demand torque. For example, after the disconnect clutch is closed, the DISG torque is ramped down to a torque level that allows the engine to provide a portion of the desired driver demand torque at an efficient engine operating condition at the present engine speed. Further, the engine torque is ramped up as the DISG torque is ramped down. Additionally, the engine torque and/or DISG torque are gradually increased by the difference captured at 408. The increase in torque compensates for the increased driveline inertia. After engine torque and/or DISG torque are increased, the engine and/or DISG are commanded to provide the desired transmission torque converter impeller torque when the disconnect clutch is closed as determined at 402. If the disconnect clutch is already closed, the engine and/or DISG are commanded to provide the desired transmission torque converter impeller torque when the disconnect clutch is closed from 402. Method 400 proceeds to 478 after transmission torque converter impeller torque is adjusted.

At 480, method 400 charges the energy storage device as described at 430. Method 400 exits after beginning to charge the energy storage device.

Thus, the method of FIG. 4 provides for a method for operating a hybrid powertrain, comprising: operating a drivetrain with a first inertia and adjusting a torque converter impeller torque during transmission gear shifting in response to the first inertia; and operating the drivetrain with a second inertia and adjusting the torque converter impeller torque during transmission gear shifting in response to the second inertia. The method includes where the first inertia includes an inertia of a driveline integrated starter/generator (DISG) and inertia of a portion of a driveline disconnect clutch.

In some examples, the method includes where the first inertia does not include inertia of an engine. The method also includes where the second inertia includes an inertia of an engine and the inertia of the DISG. The method also includes where the second inertia includes a total inertia of the driveline disconnect clutch. The method includes where the driveline disconnect clutch is in an open state. The method includes where the driveline disconnect clutch is in a closed state when the drivetrain is operated with the second inertia.

In another example, the method of FIG. 4 provides for operating a hybrid powertrain, comprising: operating a drivetrain with a first inertia and adjusting a first torque converter impeller torque during transmission gear shifting in response to the first inertia; capturing the first torque converter impeller torque in response to a request to close a driveline disconnect clutch; transitioning from the first torque converter impeller torque to a second torque converter impeller torque; and operating the drivetrain with a second inertia and adjusting the second torque converter impeller torque during transmission gear shifting in response to the second inertia after the request to close the driveline disconnect clutch. In this way, transmission shifting may be improved.

The method includes where the first torque converter impeller torque is based on the first inertia. The method also includes where the second torque converter impeller torque is based on the second inertia. The method includes where transitioning from the first torque converter impeller torque to the second torque converter impeller torque includes ramping the first torque converter impeller torque to the second torque converter impeller torque. The method includes where adjusting the second torque converter impeller torque during transmission gear shifting includes accounting for a change in transmission gear ratio. The method further comprises providing the second torque converter impeller torque while a motor in the drivetrain is converting driveline torque into electrical energy. The method includes where the second torque converter impeller torque is provided by an engine and a motor.

As will be appreciated by one of ordinary skill in the art, methods described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I8, V6, V8, V10, and V12 engines operating in natural gas, gasoline, diesel, or alternative fuel configurations could use the present description to advantage.

The invention claimed is:

1. A method for operating a hybrid powertrain, comprising:
    operating a drivetrain with a first inertia and adjusting a torque converter impeller torque during transmission gear shifting in response to the first inertia; and
    operating the drivetrain with a second inertia and adjusting the torque converter impeller torque during transmission gear shifting in response to the second inertia;
    wherein the first inertia includes an inertia of a driveline integrated starter/generator (DISG) and inertia of a portion of a driveline disconnect clutch, further comprising capturing a difference between a desired transmission torque when the driveline disconnect clutch is closed and a desired transmission torque when the driveline disconnect clutch is open and adjusting a torque source output based on the difference; and
    wherein the first inertia does not include inertia of an engine and wherein the torque converter impeller torque is based on a final drive ratio and an offset that is related to driveline spin losses.

2. The method of claim 1, where the second inertia includes an inertia of an engine and the inertia of the DISG.

3. The method of claim 2, where the second inertia includes a total inertia of the driveline disconnect clutch.

4. The method of claim 1, where the driveline disconnect clutch is in an open state.

5. The method of claim 3, where the driveline disconnect clutch is in a closed state when the drivetrain is operated with the second inertia.

6. A method for operating a hybrid powertrain, comprising:
    operating a drivetrain with a first inertia and adjusting a first torque converter impeller torque during transmission gear shifting in response to the first inertia;
    capturing the first torque converter impeller torque in a controller memory in response to a request to close a driveline disconnect clutch;
    transitioning from the first torque converter impeller torque to a second torque converter impeller torque; and
    operating the drivetrain with a second inertia and adjusting the second torque converter impeller torque during transmission gear shifting in response to the second inertia after the request to close the driveline disconnect clutch;
    wherein the first torque converter impeller torque is based on the first inertia, further comprising capturing a difference between a desired transmission torque when the driveline disconnect clutch is closed and a desired transmission torque when the driveline disconnect clutch is open, and adjusting a torque source based on the difference; and
    wherein the second torque converter impeller torque is based on the second inertia, and where the second torque converter impeller torque is further based on a final drive ratio and an offset that is related to driveline spin losses.

7. The method of claim 6, where transitioning from the first torque converter impeller torque to the second torque converter impeller torque includes ramping the first torque converter impeller torque to the second torque converter impeller torque, and where the first torque converter impeller torque is based on an amount of the first inertia and where the second torque converter impeller torque is based on an amount of the second inertia.

8. The method of claim 6, where adjusting the second torque converter impeller torque during transmission gear shifting includes accounting for a change in transmission gear ratio.

9. The method of claim 6, further comprising providing the second torque converter impeller torque while a motor in the drivetrain is converting driveline torque into electrical energy.

10. The method of claim 6, where the second torque converter impeller torque is provided by an engine and a motor.

* * * * *